United States Patent
Nagai et al.

(10) Patent No.: US 7,919,537 B2
(45) Date of Patent: Apr. 5, 2011

(54) METHODS FOR PRODUCING A POLYMER ELECTROLYTE MEMBRANE HAVING IMPROVED OXIDATION RESISTANCE

(75) Inventors: Yozo Nagai, Ibaraki (JP); Toshimitsu Tachibana, Ibaraki (JP); Soji Nishiyama, Ibaraki (JP); Tetsuya Yamaki, Takasaki (JP); Masaharu Asano, Takasaki (JP); Masaru Yoshida, Takasaki (JP)

(73) Assignees: Japan Atomic Energy Agency, Ibaraki (JP); Nitto Denko Corporation, Osaka (JP)

( * ) Notice: Subject to any disclaimer, the term of this patent is extended or adjusted under 35 U.S.C. 154(b) by 790 days.

(21) Appl. No.: 11/267,160

(22) Filed: Nov. 7, 2005

(65) Prior Publication Data

US 2006/0105216 A1 May 18, 2006

(30) Foreign Application Priority Data

Nov. 15, 2004 (JP) ................. 2004-330387

(51) Int. Cl.
- *C08J 5/22* (2006.01)
- *H01M 8/10* (2006.01)

(52) U.S. Cl. .......................... 521/27; 429/33
(58) Field of Classification Search ............. 521/27, 521/32; 429/33
See application file for complete search history.

(56) References Cited

U.S. PATENT DOCUMENTS

| | | | | |
|---|---|---|---|---|
| 4,012,303 A | * | 3/1977 | D'Agostino et al. | 521/27 |
| 4,605,685 A | * | 8/1986 | Momose et al. | 522/124 |
| 5,075,342 A | * | 12/1991 | Ishigaki et al. | 521/27 |
| 5,817,718 A | | 10/1998 | Nezu et al. | |
| 2002/0161091 A1 | * | 10/2002 | Amou et al. | 524/425 |
| 2004/0048965 A1 | * | 3/2004 | Amou et al. | 524/425 |

FOREIGN PATENT DOCUMENTS

| | | | |
|---|---|---|---|
| JP | 02-298357 | | 12/1990 |
| JP | 06116423 A | * | 4/1994 |
| JP | 09208625 A | * | 8/1997 |
| JP | 2001348439 A | * | 12/2001 |
| JP | 2003-082129 | | 3/2003 |
| JP | 2003-261697 | | 9/2003 |
| JP | 2004-014436 | | 1/2004 |
| JP | 2004-051685 | | 2/2004 |
| JP | 2004-059752 | | 2/2004 |
| JP | 2004059752 A | * | 2/2004 |
| JP | 2004-158270 | | 6/2004 |
| JP | 2004-300360 | | 10/2004 |
| JP | 2005-063778 | | 3/2005 |
| JP | 2005-142014 | | 6/2005 |
| WO | 2005/031906 A1 | | 4/2005 |

OTHER PUBLICATIONS

Flomaa et al. "The state of water and the nature of ion clusters in crosslinked proton conducting membranes of styrene grafted and sulfonates poly(vinylidene fluoride)", Journal of Materials Chemistry, Published by the Royal Society of Chemistry on Web, Oct. 9, 2000.*

Holmberg et al. "Synthesis and Properties of Sulfonated and Crosslinked [Poly(vinylidene fluoride)-graft-styrene] Membranes", Polymers for Advanced Technologies, vol. 9, pp. 121-127 (1998).*

Hietala et al. "Phase Separation and Cristallinity in Proton Conducting Membranes of Styrene Grafted and Sulfonated Poly(vinylidene fluoride)", Journal of Polymer Science: Part A: Polymer Chemistry, vol. 37, 1741-1753 (1999).*

Mattson et al. "Micro-Raman Investigations of PVDF-Based Proton-Conducting Membranes", Journal of Polymer Science: Part A: Polymer Chemistry, vol. 37, 3317-3327 (1999).*

Hietala et al. "Thermal stability of styrene grafted and sulfonated proton conducting membranes based on poly(vinylidene fluoride)", J. of Mater. Chem., 1998, 8(5), 1127-1132.*

"The influence of crosslinker on the properties of radiation-grafted films and membranes based on EFTE" by Ben youcef et al., Journal of Membrane Science 311 (2008) 208-215.

* cited by examiner

*Primary Examiner* — Michael M Bernshteyn

(57) ABSTRACT

A method for producing a polymer electrolyte membrane for electrolyte fuel cells includes: irradiating gamma rays onto a polymer substrate to obtain a crosslinked polytetrafluoroetylene substrate, grafting a styrenic monomer and bis(vinylphenyl)ethane as monomers to the crosslinked polymer substrate, and introducing sulfonic acid groups into graft side chains formed by grafting. Fluoro polymer substrates such as polytetrafluoroethylene and ethylene tetrafluoroethylene copolymer may be used.

6 Claims, No Drawings

METHODS FOR PRODUCING A POLYMER ELECTROLYTE MEMBRANE HAVING IMPROVED OXIDATION RESISTANCE

BACKGROUND OF THE INVENTION

This invention relates to a polymer electrolyte membrane suitable for use in polymer electrolyte fuel cells. More particularly, the invention relates to a polymer electrolyte membrane in polymer electrolyte fuel cells that has improved oxidation resistance and good adhesion to electrodes.

Polymer electrolyte fuel cells feature high energy density, so they have potential use in a wide range of applications including power supplies to household cogeneration systems, power supplies to mobile communication devices, power supplies to electric cars, and convenient auxiliary power supplies.

In a polymer electrolyte fuel cell, the polymer electrolyte membrane functions as an electrolyte for conducting protons and it also plays the part of diaphragm which prevents direct mixing of the fuel hydrogen or methanol with oxygen. The polymer electrolyte membrane which plays the part of an electrolyte causes an electric current to flow over a prolonged period, so it has several requirements to meet: good electrochemical stability, in particular, good stability in acidic aqueous solution (acid resistance), good resistance to peroxide radicals or the like (oxidation resistance) and good heat resistance, as well as high ion conductivity. In addition, the polymer electrolyte membrane which also plays the part of diaphragm is required to have low permeability to the fuel hydrogen gas or methanol and oxygen gas, as well as having high membrane's mechanical strength.

A common example of such polymer electrolyte membrane has been Nafion® which is a perfluorosulfonic acid-based membrane developed by DuPont. The conventional fluorocarbon polymer ion-exchange membranes such as Nafion® have outstanding chemical stability but, on the other hand, they have several problems including low electrical conductivity, insufficient water retention which causes the ion-exchange membrane to dry up, which in turn leads to a further decrease in electrical conductivity, and in the case of using methanol for fuel, the membrane swells in alcohols and cross-over of the methanol lowers the characteristics of the fuel cell. If, in order to deal with these problems, one introduces more sulfonic acid groups, the membrane strength drops markedly upon holding water, whereby it will break easily; hence, it has been difficult to meet both requirements for electrical conductivity and membrane strength. Still another problem of the fluorocarbon polymer electrolyte membranes such as Nafion® is that the synthesis of fluorine-containing monomers as a starting material is complex enough to make the product membrane very expensive, and this presents a large obstacle to realizing commercially feasible polymer electrolyte fuel cells.

Hence, efforts have been made to develop low-cost and high-performance polymer electrolyte membranes that can be substituted for Nafion® and other conventional fluorocarbon polymer electrolyte membranes, and an example that has been proposed is a polymer electrolyte membrane that is synthesized by first introducing through a radiation-induced graft reaction a styrene monomer into an ethylene-tetrafluoroethylene copolymer (ETFE) film having a hydrocarbon structure and then sulfonating the introduced monomer (see, for example, JP 9-102322 A). However, this polymer electrolyte membrane has a serious drawback; the main chain of the polymer membrane and the polystyrene graft chains are composed of hydrocarbons, so if a large electric current is applied to the membrane for a prolonged period, both the hydrocarbon chain portion and the polystyrene graft chain portion undergo oxidative deterioration and the electrical conductivity of the membrane drops considerably.

In another example, it has been proposed that the cell characteristics be improved by forming graft side chains of a crosslinked copolymer using styrene and divinylbenzene, such that the graft chains have a crosslinked structure introduced thereinto (see, for example, JP 11-111310 A). This method of crosslinking the graft chains with divinylbenzene offers the advantage of improving oxidation resistance by allowing a greater amount of divinylbenzene to be introduced; on the other hand, the membrane becomes less flexible, probably because divinylbenzene is localized on the membrane surface during graft polymerization.

In general, as the electrical conductivity of a polymer electrolyte membrane increases, the internal resistance of the cell decreases and it outputs more power. However, some of the conventional polymer electrolyte membranes output only low power even if their electrical conductivity is high. One reason for this problem is that due to prolonged use, the adhesion between either electrode and the polymer electrolyte membrane decreases and a gap forms at the interface to reduce the electrical conductivity in that area. In addition, if the polymer electrolyte membrane becomes less flexible, its adhesion to either electrode decreases, again reducing the electrical conductivity in that area.

A need therefore exists for developing a polymer electrolyte membrane for polymer electrolyte fuel cells that has improved oxidation resistance and good adhesion to electrodes.

SUMMARY OF THE INVENTION

The present invention has been accomplished under these circumstances and has as an object providing a polymer ion-exchange membrane suitable for use as a polymer electrolyte membrane in fuel cells that is produced by radiation-induced graft polymerization and which has improved oxidation resistance and good adhesion to electrodes.

The present inventors conducted intensive studies in order to attain the stated object and found that a polymer electrolyte membrane having improved oxidation resistance and good adhesion to electrodes could be provided by modifying the grafting of a styrenic monomer to a polymer substrate in such a way that a specified monomer was added for graft polymerization and that sulfonic acid groups were introduced into the graft side chains formed.

Therefore, the polymer electrolyte membrane of the present invention for use in polymer electrolyte fuel cells is characterized by grafting a styrenic monomer and bis(vinylphenyl)ethane (hereunder abbreviated as BVPE) as monomers to a polymer substrate and then introducing sulfonic acid groups into the graft side chains formed.

Using BVPE in combination with the styrenic monomer has the advantage that graft polymerization can be performed uniformly across the thickness of the membrane and that a crosslinked structure can be introduced into the graft side chains. As a result, one can provide a polymer electrolyte membrane for polymer electrolyte fuel cells that has improved oxidation resistance and good adhesion to electrodes.

In the polymer electrolyte membrane of the present invention, the polymer substrate is preferably made of a fluorocarbon polymer or an olefinic polymer.

In the polymer electrolyte membrane of the present invention, the styrenic monomer is preferably one or more species selected from the group consisting of styrene, α-methylstyrene, vinyltoluene, and trifluorostyrene.

According to the present invention, a polymer ion-exchange membrane suitable for use as a polymer electrolyte membrane in fuel cells can be provided by radiation-induced graft polymerization and it has improved oxidation resistance and good adhesion to electrodes. The polymer electrolyte membrane of the present invention is improved in electrical conductivity, oxidation resistance, and adhesion to electrodes and if it is used as a polymer electrolyte membrane in a polymer electrolyte fuel cell, the latter can exhibit consistent characteristics as a fuel cell.

DETAILED DESCRIPTION OF THE INVENTION

The polymer electrolyte membrane of the present invention for use in polymer electrolyte fuel cells can be produced by grafting a styrenic monomer and BVPE as monomers to a polymer substrate and then introducing sulfonic acid groups into the graft side chains formed.

The polymer substrate that can be employed in the present invention may be exemplified by fluorocarbon polymers, olefinic polymers, polyimide polymers and others that are highly durable against electrochemical reactions or the like that occur within the cell. It is preferred to use fluorocarbon polymers and olefinic polymers since they have particularly high durability against electrochemical reactions or the like that occur within the cell.

Specific examples of fluorocarbon polymers that can be used include polytetrafluoroethylene (hereunder abbreviated as PTFE), tetrafluoroethylene-hexafluoropropylene copolymers (hereunder abbreviated as FEP), tetrafluoroethylene-perfluoroalkylvinyl ether copolymers (hereunder abbreviated as PFA), poly(vinylidene fluoride) (hereunder abbreviated as PVDF), ethylene-tetrafluoroethylene copolymers (hereunder abbreviated as ETFE), ethylene-chlorotrifluoroethylene copolymers (hereunder abbreviated as ECTFE), etc. If these substrates are preliminarily crosslinked, the dimensional changes that occur upon water retention can be reduced. Methods of crosslinking such as for PTFE are disclosed in JP 6-116423 A. Methods of crosslinking FEP and PFA are disclosed in JP 11-49867 A.

Olefinic polymers may specifically be exemplified by polyethylene and polypropylene of various grades including low density, high density, and super-high molecular weight. Using crosslinked olefinic polymers is preferred in some applications since the polymer electrolyte membrane obtained is not only improved in heat resistance but also suppressed in swelling.

The morphology of the polymer substrate which is dictated by the demand for its use as a polymer electrolyte membrane in polymer electrolyte fuel cells is a membrane (film) and its size and thickness can be determined appropriately.

Styrenic monomers that can be employed in the present invention may be exemplified by styrene and its derivatives in which one or more of hydrogen atoms in styrene are substituted by different functional groups. Such styrenic monomers may be used either alone or in combination of two or more species but at least one of the monomers used must either allow for introduction of sulfone groups and other cation-exchange groups after graft reaction or have cation-exchange groups or derivatives thereof in the monomer structure.

The styrenic monomer of the present invention is preferably one or more species selected from the group consisting of styrene, α-methylstyrene, vinyltoluene, and trifluorostyrene.

In the present invention, the loading of BVPE can be adjusted as appropriate for the level of oxidation resistance that is required by the polymer electrolyte membrane to be obtained; however, it is generally preferred to add BVPE in an amount of at least 2 wt % with reference to the weight of the styrenic monomer present in the process of graft polymerization. If the loading of BVPE is less than 2 wt %, there will be no marked improvement in oxidation resistance.

In the present invention, the styrenic monomer and BVPE may be used as diluted in solvents. Applicable diluting solvents are not limited to any particular types but may include hydrocarbons such as toluene and hexane, alcohols such as methanol, ethanol and isopropyl alcohol, ketones such as acetone, methyl isopropyl ketone and cyclohexane, ethers such as dioxane and tetrahydrofuran, esters such as ethyl acetate and butyl acetate, and nitrogenous compounds such as isopropylamine, diethanolamine, N-methylformamide and N,N-dimethylformamide. At least one of these solvents may appropriately be chosen for use. If the monomers are used as diluted in solvents, their concentrations are not limited to any particular values but are usually at least 20 wt %.

Grafting of the above-mentioned monomers to the polymer substrate may be performed either by "pre-irradiation" in which the substrate is first irradiated before polymerization reaction with the monomers, or by "simultaneous irradiation" in which the substrate and the monomers are simultaneously irradiated to effect polymerization reaction. Use of the pre-irradiation method is preferred since a homopolymer which does not graft to the polymer substrate will be produced in smaller amounts. The pre-irradiation method can be implemented in two ways, the polymer radical process in which the polymer substrate is irradiated in an inert gas, and the peroxide process in which the substrate is irradiated in an oxygen-containing atmosphere. Either process can be adopted in the present invention.

An example of the pre-irradiation method is described below.

To begin with, the polymer substrate is inserted into a glass vessel, which is degassed to create a vacuum and then purged with an inert gas atmosphere. Thereafter, the vessel now containing the substrate is irradiated with electron beams or γ-rays at between −10 and 80° C., preferably around room temperature, to a total dose of 1-500 kGy. Subsequently, the vessel containing the irradiated substrate is filled with liquid monomers or a solution of monomers (in a solvent). The liquid monomers or the solution of monomers should be preliminarily deprived of oxygen gas by a suitable means such as bubbling with an oxygen-free inert gas or freeze-degassing. Graft polymerization for introducing graft chains of polymer into the irradiated substrate is usually performed at 30-160° C., preferably at 40-90° C.

The degree of graft in the polymer thus obtained (i.e., the weight percentage of graft chains with respect to the polymer substrate before polymerization) is preferably 7-200 wt %, more preferably 10-100 wt %. The degree of graft can be appropriately adjusted depending on the dose of irradiation, polymerization temperature, polymerization time, etc.

The polymer substrate into which graft chains have been introduced is subjected to the next step of introducing cation-exchange groups such as sulfone groups. Introduction of cation-exchange groups into graft chains can be accomplished by known methods. For instance, as regards the introduction of sulfone groups, the necessary conditions are disclosed in JP 2001-348439 A. Specifically, chlorosulfonic acid is dissolved in solvent 1,2-dichloroethane at a concentration of 0.2-0.5 moles/L and the polymer substrate that has passed through the graft reaction is immersed in the chlorosulfonic acid solution at between room temperature and 80° C. for a period of 1-48 hours. After the lapse of a specified time of reaction, the membrane is thoroughly washed with water. To effect sulfonation reaction, sulfonating agents are necessary and examples that can be used are conc. sulfuric acid, sulfur trioxide and sodium thiosulfate; other compounds may be used without any particular limitation as long as they can introduce the sulfone groups.

The thus produced polymer electrolyte membrane of the present invention may be subjected to discharge or other treatments for providing better adhesion to electrodes by introducing hydroxyl, carbonyl, carboxyl, or other hydrophilic functional groups into the membrane surface. Discharge treatment can be effected by glow-discharge assisted plasma treatment, sputter etching, atmospheric plasma treatment, corona treatment and the like.

The polymer electrolyte membrane of the present invention has preferably an electrical conductivity at 25° C. of at least $0.05\ \Omega^{-1}\ cm^{-1}$, more preferably at least $0.1\ \Omega^{-1}\ cm^{-1}$. If its electrical conductivity at 25° C. is less than $0.05\ \Omega^{-1}\ cm^{-1}$, the membrane resistance is so great that it is difficult for the cell to output adequate power.

The thickness of the polymer electrolyte membrane may be mentioned as one of the characteristics that are associated with its resistance and in order to lower membrane resistance, the thickness of the membrane is preferably reduced. However, if the polymer electrolyte membrane is too thin, its strength decreases to increase the chance of it breaking and membrane defects such as pinholes are also likely to occur. Hence, the thickness of the polymer electrolyte membrane is preferably 5-300 μm, more preferably 20-150 μm. The thickness of the polymer electrolyte membrane depends on the thickness of the polymer substrate to be used, as well as on the degree of graft. If the degree of graft is low, the thickness of the polymer electrolyte membrane is substantially the same as that of the polymer substrate; if the degree of graft increases, the thickness of the polymer electrolyte membrane increases.

On the following pages, the present invention is described with reference to examples and comparative examples, to which the invention is by no means limited.

Example 1

A PTFE film 50 μm thick was cut to a size of 10 cm by square and put into a SUS autoclaved irradiation vessel (4 cm i.d.×30 cm high) equipped with a heater. The interior of the vessel was degassed to $1\times10^{-2}$ Torr (1.3 Pa) and then filled with argon gas to give an internal pressure of 1 atm. Subsequently, the heater around the vessel was turned on to raise the inside temperature to 340° C. and $^{60}$Co-γ rays were applied for a total dose of 120 kGy at a dose rate of 3 kGy/hr. After the irradiation, the vessel was cooled and the film was recovered as a crosslinked PTFE.

The crosslinked PTFE film was charged into a separable glass container (3 cm i.d.×20 cm high) equipped with a cock; after degassing, the container was filled with argon gas at 1 atm. Under this condition, $^{60}$Co-γ rays were again applied, but at room temperature, for a total dose of 60 kGy at a dose rate of 10 kGy/hr. Subsequently, the same container was charged with about 100 g of a preliminarily degassed styrene/BVPE/toluene liquid mixture (a liquid mixture of 50 wt % styrene, 5 wt % BVPE, and 45 wt % toluene) in an argon atmosphere. The film was found to be completely immersed in the liquid mixture. After charging the liquid mixture, the container was heated at 60° C. for 36 hours to effect graft reaction, following which the film was thoroughly washed with toluene and dried to give a graft membrane.

The crosslinked PTFE film after graft polymerization was immersed in a 0.3M chlorosulfonic acid solution diluted with 1,2-dichloroethane and it was heated at 60° C. for 24 hours in a sealed condition. After washing with water, the film was dried to give a sulfonated graft membrane, or a polymer electrolyte membrane.

Example 2

An ETFE film 50 μm thick was cut to a size of 10 cm by square and put into a SUS autoclaved irradiation vessel (4 cm i.d.×30 cm high). The interior of the vessel was degassed to $1\times10^{-2}$ Torr (1.3 Pa) and then filled with argon gas to give an internal pressure of 1 atm. Subsequently, electron beams were applied for a total dose of 350 kGy at room temperature. After the irradiation, the film was recovered as a crosslinked ETFE.

The crosslinked ETFE film was charged into a separable glass container (3 cm i.d.×20 cm high) equipped with a cock; after degassing, the container was filled with argon gas to 1 atm. Under this condition, electron beams were again applied at room temperature for a total dose of 80 kGy. Subsequently, the same container was charged with about 100 g of a preliminarily degassed styrene/BVPE/toluene liquid mixture (a liquid mixture of 50 wt % styrene, 6 wt % BVPE, and 44 wt % toluene) in an argon atmosphere. The film was found to be completely immersed in the liquid mixture. After charging the liquid mixture, the container was heated at 60° C. for 50 hours to effect graft reaction, following which the film was thoroughly washed with toluene and dried to give a graft membrane.

The crosslinked ETFE film after graft polymerization was immersed in a 0.3M chlorosulfonic acid solution diluted with 1,2-dichloroethane and it was heated at 60° C. for 24 hours in a sealed condition. After washing with water, the film was dried to give a sulfonated graft membrane, or a polymer electrolyte membrane.

Example 3

A polymer electrolyte membrane was produced by repeating the procedure of Example 2, except that no crosslinking step was taken.

Example 4

A polymer electrolyte membrane was produced by repeating the procedure of Example 2, except that the ETFE film was changed to a PVDF film 50 μm thick, the processing solution for graft polymerization was changed to a vinyltoluene/BVPE/divinylbenzene liquid mixture (a liquid mixture of 90 wt % vinyltoluene, 6 wt % BVPE and 4 wt % divinylbenzene), and that the graft reaction conditions were changed to 60° C.×10 hrs.

Comparative Example 1

A polymer electrolyte membrane was produced by repeating the procedure of Example 1, except that the processing solution for graft polymerization was changed to a styrene/toluene liquid mixture (a liquid mixture of 50 wt % styrene and 50 wt % toluene).

Comparative Example 2

A polymer electrolyte membrane was produced by repeating the procedure of Example 2, except that no crosslinking treatment was performed and that the processing solution for graft polymerization was changed to a styrene/divinylbenzene liquid mixture (a liquid mixture of 90 wt % styrene and 10 wt % divinylbenzene).

(Characteristic Evaluation of Polymer Electrolyte Membranes)

The characteristics of the polymer electrolyte membranes produced in Examples 1-4 and Comparative Examples 1 and 2 were evaluated by the following methods. The results of evaluations are shown in Table 1.

(1) Degree of Graft ($X_{ds}$)

The degree of graft was calculated by the following equation:

$$X_{ds}=(W_2-W_1)\times 100/W_1$$

$W_1$: the weight (g) of the polymer substrate before grafting
$W_2$: the weight (g) of the polymer substrate after grafting (2) Electrical Conductivity ($\kappa$)

The electrical conductivity of the polymer electrolyte membrane was measured by the AC method [Shin-Jikken Kagaku Koza (New Course in Experimental Chemistry) 19, Kobunshi Kagaku (Polymer Science) <II>, p. 992, Maruzen] using a conventional membrane resistance measuring cell and an LCR meter (E-4925A of Hewlett-Packard) so as to measure the membrane resistance ($R_m$). The cell was filled with a 1M aqueous sulfuric acid solution and the resistance between platinum electrodes (5 mm apart) was measured both in the presence and absence of the membrane. The electrical conductivity (specific conductance) of the membrane was calculated by the following equation:

$$\kappa = 1/Rm \cdot d/S (\Omega^{-1}\,cm^{-1})$$

(3) Oxidation Resistance (Residual % by Weight)

The polymer electrolyte membrane was vacuum dried at 60° C. for 16 hours and its weight measured $W_3$; the membrane was then treated with a 3% aqueous $H_2O_2$ solution at 70° C. for 24 hours and its weight measured $W_4$; the oxidation resistance of the membrane was determined by the following equation:

$$\text{Oxidation resistance}=100(W_4/W_3)$$

(4) Adhesion to Electrodes (Cell Voltage)

Using the polymer electrolyte membranes prepared in Examples 1-4 and Comparative Examples 1 and 2, fuel cells were fabricated by the method described below and the outputs of those cells were measured.

Two sheets of carbon paper (TGP-H-060 of Toray Industries, Inc.), one for anode and the other for cathode, were treated with a carbon black dispersed PTFE dispersion (in 1:1 weight ratio) to render their surfaces water repelling. To the water repelling surface of each carbon paper, a paste having platinum (catalyst) on carbon black dispersed in a solution of Nafion (DuPont) dissolved in isopropanol was applied by screen printing to make an electrode carrying the catalyst in an amount of 0.5 mg/cm². The thus prepared anode and cathode electrodes were placed over the polymer electrolyte membrane such that the catalyst-coated surface of each electrode was in contact with the membrane and held under the conditions of 135° C.×10 MPa for 2 minutes to make a polymer electrolyte membrane/electrode assembly. This assembly was built into an evaluating cell with an electrode area of 5 cm² (product of ElectroChem, Inc.) and operated under the following conditions: anode gas (hydrogen) supplied at 350 ml/min; cathode gas (air) at 1,000 ml/min; cell temperature, 80° C.; bubbler temperature, 80° C. The voltage (V) at a current density of 1 A/cm² was measured.

TABLE 1

Results of Evaluation of Cell Characteristics

| | Degree of graft (%) | Conductivity ($\Omega^{-1}\,cm^{-1}$) | Oxidation resistance (%) | Cell voltage (V) |
|---|---|---|---|---|
| Example 1 | 25 | 0.11 | 98 | 0.65 |
| Example 2 | 35 | 0.12 | 99 | 0.65 |
| Example 3 | 37 | 0.13 | 97 | 0.66 |
| Example 4 | 36 | 0.13 | 97 | 0.66 |
| Comparative Example 1 | 30 | 0.11 | 79 | 0.65 |
| Comparative Example 2 | 35 | 0.12 | 93 | 0.45 |

As shown above, the samples of Examples 1-4 had not only improved oxidation resistance but also good enough adhesion to electrodes to produce high output; on the other hand, the sample of Comparative Example 1 had lower oxidation resistance and the sample of Comparative Example 2 had poor adhesion to electrodes and while exhibiting comparable electrical conductivity to the samples of the Examples, its output decreased significantly.

What is claimed is:

1. A method for producing a polymer electrolyte membrane for polymer electrolyte fuel cells, the method comprising:
    crosslinking a polytetrafluoroethylene substrate by irradiating the polytetrafluoroethylene substrate in a vessel using gamma-rays, cooling the vessel, and recovering a crosslinked polytetrafluoroethylene substrate from the vessel;
    charging a container with the crosslinked polytetrafluoroethylene substrate;
    irradiating the crosslinked polytetrafluoroethylene substrate using gamma-rays;
    charging the container with a liquid mixture comprising a styrenic monomer and a bis(vinylphenyl)ethane monomer;
    graft polymerizing the styrenic monomer and the bis(vinylphenyl)ethane monomer to the crosslinked polytetrafluoroethylene substrate; and
    introducing sulfonic acid groups into graft side chains formed by the graft polymerization.

2. A method for producing a polymer electrolyte membrane for polymer electrolyte fuel cells, the method comprising:
    crosslinking an ethylene-tetrafluoroethylene copolymer substrate by irradiating the ethylene-tetrafluoroethylene copolymer substrate in a vessel using gamma-rays and recovering a crosslinked ethylene-tetrafluoroethylene copolymer substrate from the vessel;
    charging a container with the crosslinked ethylene-tetrafluoroethylene copolymer substrate;
    irradiating the crosslinked ethylene-tetrafluoroethylene copolymer substrate;
    charging the container with a liquid mixture comprising a styrenic monomer and a bis(vinylphenyl)ethane monomer;
    graft polymerizing the styrenic monomer and the bis(vinylphenyl)ethane monomer to the crosslinked ethylene-tetrafluoroethylene copolymer substrate; and
    introducing sulfonic acid groups into graft side chains formed by the graft polymerization.

3. The method of claim 1, wherein the graft polymerization is performed by simultaneously irradiating the monomers and the crosslinked polytetrafluoroethylene substrate during the irradiating the crosslinked polytetrafluoroethylene substrate.

4. The method of claim 2, wherein the graft polymerization is performed by simultaneously irradiation the monomers and the crosslinked ethylene-tetrafluoroethylene copolymer substrate during the irradiating the crosslinked ethylene-tetrafluoroethylene copolymer substrate.

5. A method for producing a polymer electrolyte membrane for polymer electrolyte fuel cells, the method comprising:
   crosslinking a poly(vinylidenefluoride) substrate by irradiating the poly(vinylidenefluoride) substrate in a vessel using gamma-rays and recovering a crosslinked poly(vinylidenefluoride) substrate from the vessel;
   charging a container with the crosslinked poly(vinylidenefluoride) substrate;
   irradiating the crosslinked poly(vinylidene fluoride) substrate using gamma-rays;
   charging the container with a liquid mixture comprising a styrenic monomer and a bis(vinyphenyle)ethane monomer;
   graft polymerizing the styrenic monomer and bis(vinylphenyl)ethane monomer to the crosslinked poly(vinylidenefluoride) substrate; and
   introducing sulfonic acid groups into graft side chains formed by the graft polymerization.

6. The method of claim 5, wherein the graft polymerization is performed by simultaneously irradiating the monomers and the crosslinked polyvinylidenefluoride substrate during the irradiating the crosslinked polyvinylidenefluoride substrate.

* * * * *

UNITED STATES PATENT AND TRADEMARK OFFICE
CERTIFICATE OF CORRECTION

PATENT NO. : 7,919,537 B2
APPLICATION NO. : 11/267160
DATED : April 5, 2011
INVENTOR(S) : Yozo Nagai et al.

It is certified that error appears in the above-identified patent and that said Letters Patent is hereby corrected as shown below:

On the Title Page
Item [56](Other Publications), Line 17, Delete "fluoride" and insert -- fluoride) --, therefor.
Item [57] (Abstract), Lines 3-4, Delete "polytetrafluoroetylene" and insert
-- polytetrafluoroethylene --, therefor.

In the Claims:
Column 9, Line 4, In Claim 4, delete "irradiation" and insert -- irradiating --, therefor.
Column 10, Line 4, In Claim 5, delete "bis(vinyphenyle)ethane" and insert
-- bis(vinyphenyl)ethane --, therefor.

Signed and Sealed this
Nineteenth Day of March, 2013

Teresa Stanek Rea
*Acting Director of the United States Patent and Trademark Office*